(12) United States Patent
Henion et al.

(10) Patent No.: US 6,511,192 B1
(45) Date of Patent: Jan. 28, 2003

(54) SIDE VIEW MIRROR WITH INTEGRAL LIGHTING

(75) Inventors: Paul R. Henion, Fort Gratiot, MI (US); James S. Sturek, St. Clair, MI (US); Graham B. McCloy, Cundletown (AU); Robert W. Gilbert, Willung (AU); Bernard Duroux, Gharancieres (FR); Neil J. Francis, Malvern (AU)

(73) Assignee: Britax Vision Systems (North America) Inc., Marysville, MI (US)

( * ) Notice: Subject to any disclaimer, the term of this patent is extended or adjusted under 35 U.S.C. 154(b) by 0 days.

(21) Appl. No.: 09/482,204

(22) Filed: Jan. 12, 2000

Related U.S. Application Data

(60) Provisional application No. 60/172,711, filed on Dec. 17, 1999.

(51) Int. Cl.$^7$ ............ G02B 5/10; G02B 7/182; B60R 1/06
(52) U.S. Cl. ........... 359/864; 359/865; 359/872; 248/476; 248/477
(58) Field of Search ............ 359/850, 854, 359/855, 864, 865, 872; 248/476, 477, 479

(56) References Cited

U.S. PATENT DOCUMENTS

| | | | |
|---|---|---|---|
| 3,021,756 A | * 2/1962 | Milton et al. | |
| 3,337,285 A | * 8/1967 | Travis | 359/864 |
| 3,375,053 A | * 3/1968 | Ward | 359/864 |
| 3,563,638 A | * 2/1971 | Panozzo | 359/864 |
| 4,274,078 A | 6/1981 | Isobe et al. | |
| 4,475,100 A | 10/1984 | Duh | |
| 4,678,294 A | * 7/1987 | Van Nostrand | |
| 4,714,322 A | * 12/1987 | Cook | |
| 4,938,577 A | * 7/1990 | Sugita | 248/479 |
| 5,052,792 A | * 10/1991 | Mc Donough | 359/865 |
| 5,153,781 A | * 10/1992 | Brandt | 359/865 |
| 5,412,512 A | * 5/1995 | Zebold et al. | 359/864 |
| 5,615,054 A | * 3/1997 | Lang et al. | 359/855 |
| 5,621,577 A | * 4/1997 | Lang et al. | 359/872 |

FOREIGN PATENT DOCUMENTS

| | | |
|---|---|---|
| EP | 0858932 A2 | 8/1998 |
| JP | 6022448 U | 2/1985 |
| JP | 62128955 U | 8/1987 |
| JP | 8268188 | 10/1996 |

* cited by examiner

Primary Examiner—Ricky D. Shafer
(74) Attorney, Agent, or Firm—Warn, Burgess & Hoffmann, P.C.

(57) ABSTRACT

A mirror assembly in which the mirror housing and multi-function backing plate provide various useful functions. The multi-function backing plate supports not only a conventional reflective element but also supports a wide angle reflective element. The wide angle reflective element may be adjustable. The multi-function backing plate supports an indicator light assembly so that the mirror assembly can provide an indicator light function. The multi-function backing plate also support a recessible spot or approach lamp which, when the mirror is in an operative position, is recessed within the housing. When the mirror is in an inoperative state, the multi-function backing plate can be rotated so as to expose the spot or approach light. Various light pipe configurations enable transmission of light projected from a light source mounted to and behind the multi-function backing plate to project light through the light pipe externally to the mirror housing to provide an indicator light function.

6 Claims, 13 Drawing Sheets

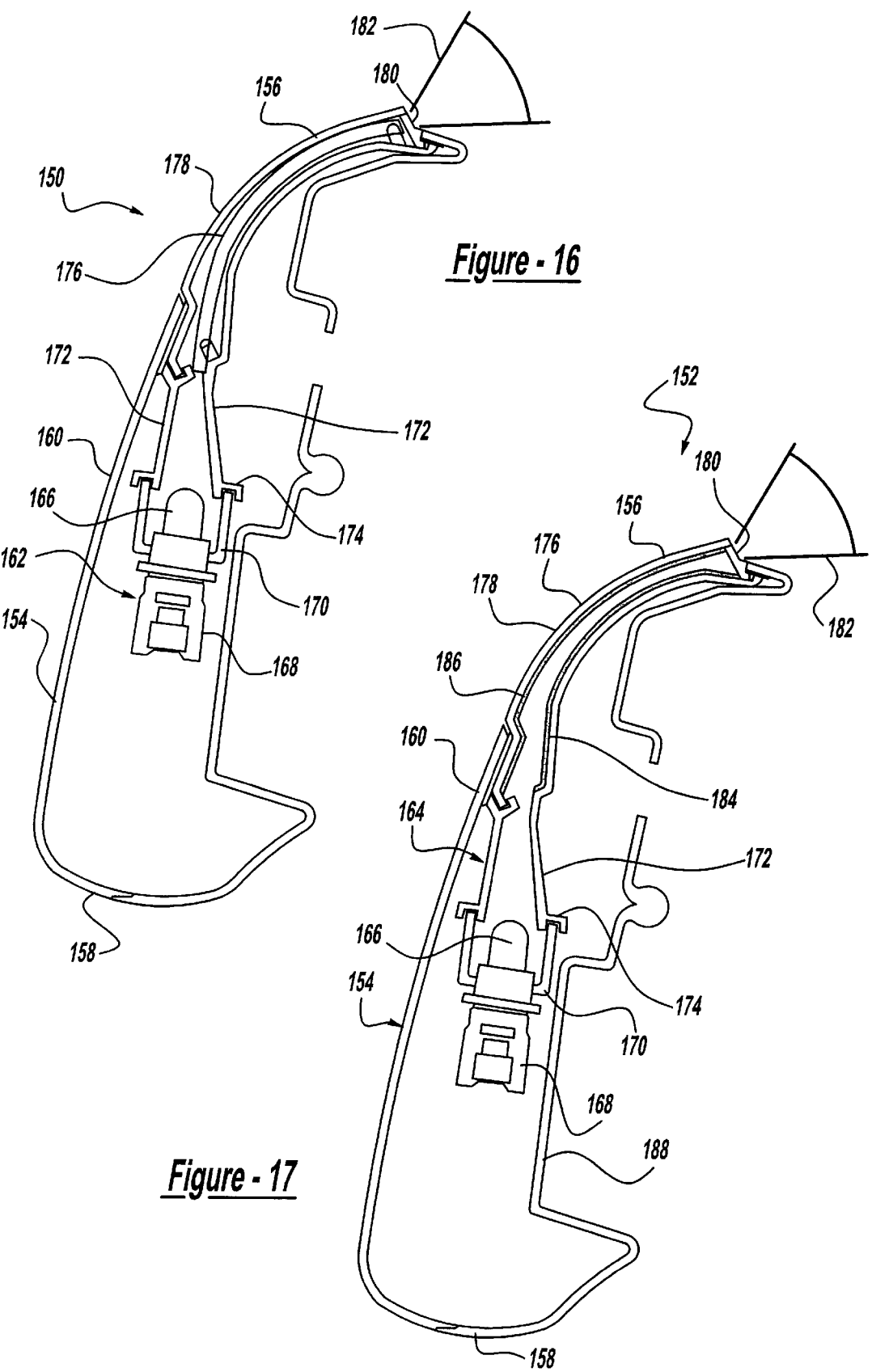

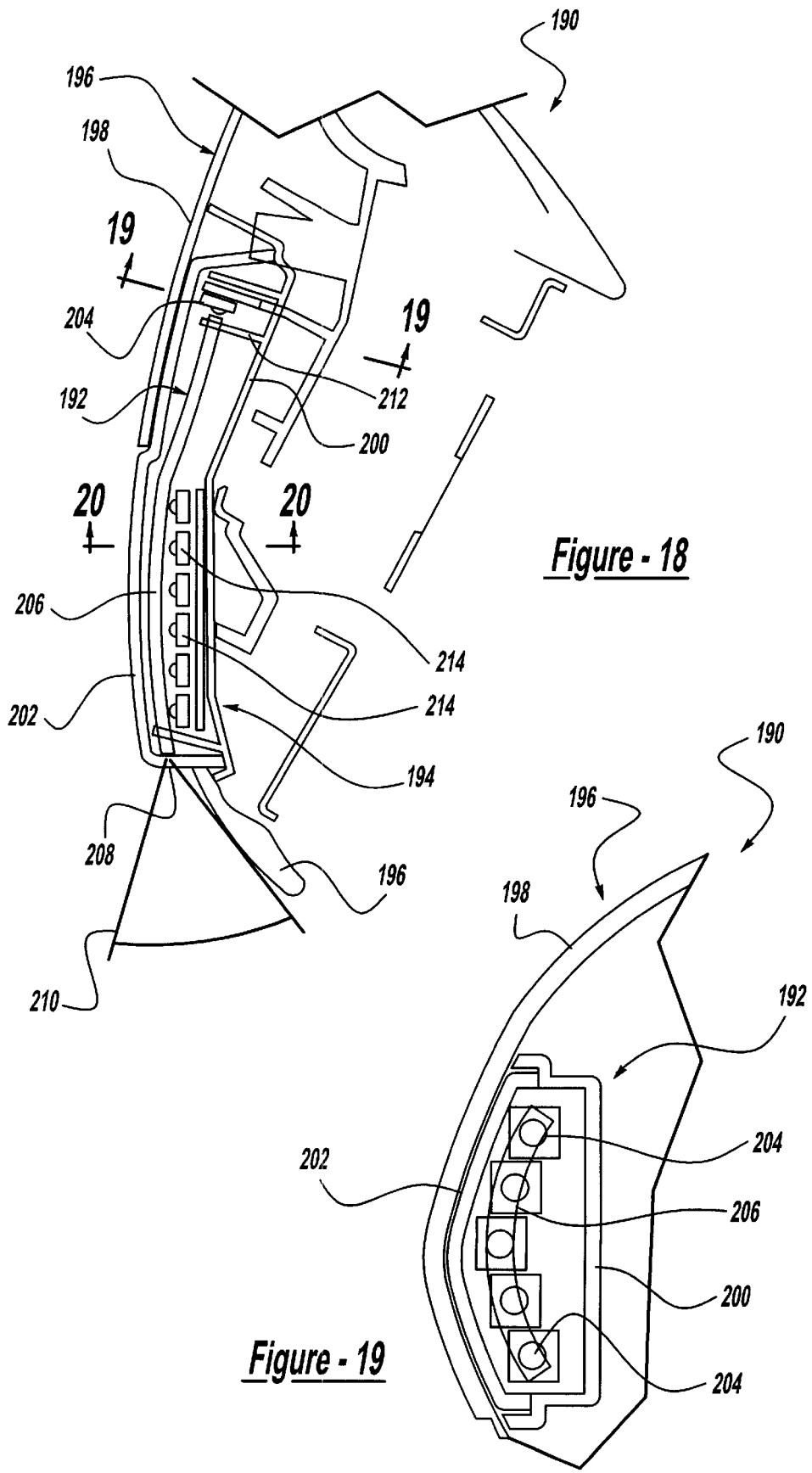

SIDE VIEW MIRROR WITH INTEGRAL LIGHTING

This application claims the benefit of Provisional Application No. 60/172,711, filed Dec. 17, 1999, now abandoned.

The present invention relates generally to improvements in assemblies.

BACKGROUND AND SUMMARY OF THE INVENTION

In automotive vehicles, exterior, rear-view mirror assemblies typically enable the driver to conveniently view reward and sideward portions of the vehicle to check for obstacles or other vehicles. Typically, the mirror assembly includes a housing which attaches to the vehicle and supports a backing assembly which supports the reflective element. The reflective element typically adjusts so that various rearward and sideward portions around the vehicle may be viewed by the driver. The reflective element is typically a flat assembly.

Present assemblies include many useful features such as indicator lights, turn signal lighting, and spotlights. However, existing designs do not fully utilize the overall structure of the mirror assembly in order to most efficiently implement and utilize such features.

Thus, the subject invention is directed to improvements in multifunction mirror assemblies.

The subject invention is also directed to the inclusion of several additional features in exterior, rear-view mirror assemblies.

For a more complete understanding of the invention, its objects and advantages, reference should be made to the following specification and to the accompanying drawings.

BRIEF DESCRIPTION OF THE DRAWINGS

FIG. 16 is a horizontal, crosssectional view of a mirror assembly having a light source and a light pipe for directing light from the light source out of the mirror housing arranged in accordance with the principles of the present invention;

FIG. 17 is a horizontal, crosssectional view of a mirror assembly having a light source and a light pipe formed by opposing surfaces of the housing and multi-function backing plate arranged in accordance with the principles of the present invention;

FIG. 18 is a horizontal, crosssectional view of a mirror mounted side repeater lamp assembly having indicator lights, light sources, and light pipes arranged in accordance with the principles of the present invention;

FIG. 19 is a crosssectional view taken along the lines 19—19 of FIG. 18;

FIG. 27 is an expanded view of the reflective element of FIG. 25.

DETAILED DESCRIPTION OF THE DRAWINGS

Figure 1:
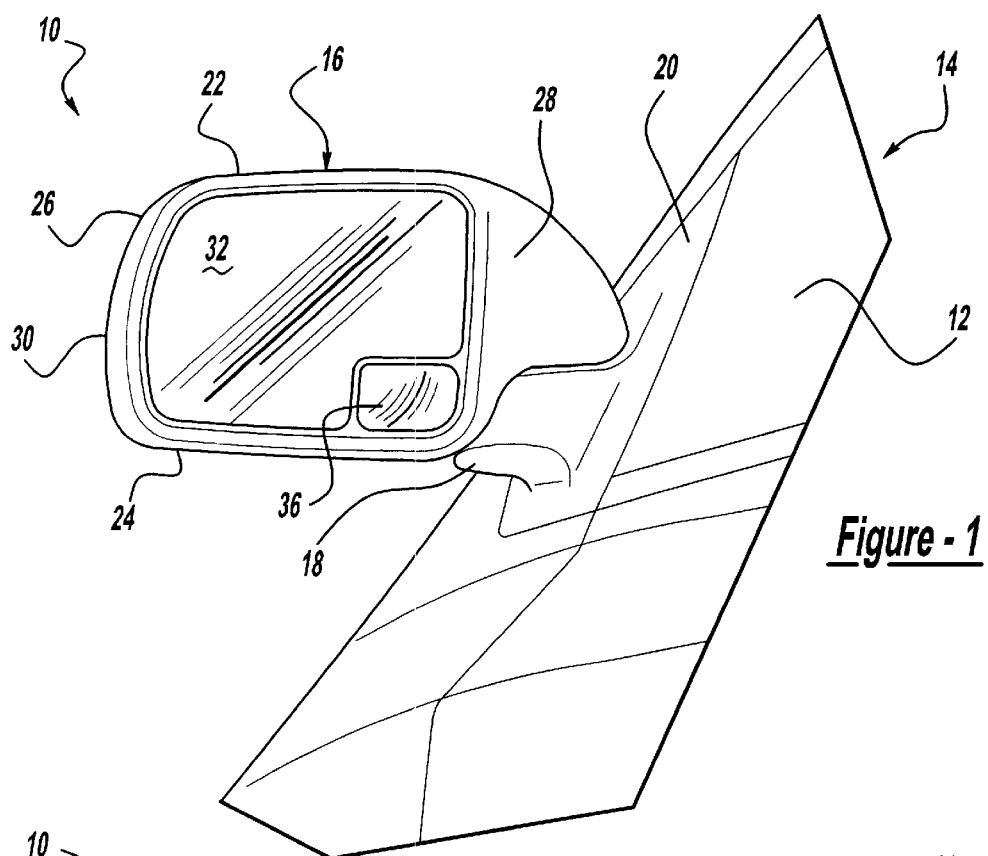
FIG. 1 is a perspective view of an exterior rear view mirror assembly having an integral spotter or fish-eye mirror arranged in accordance with the principles of the present of the invention.
Figure 2:
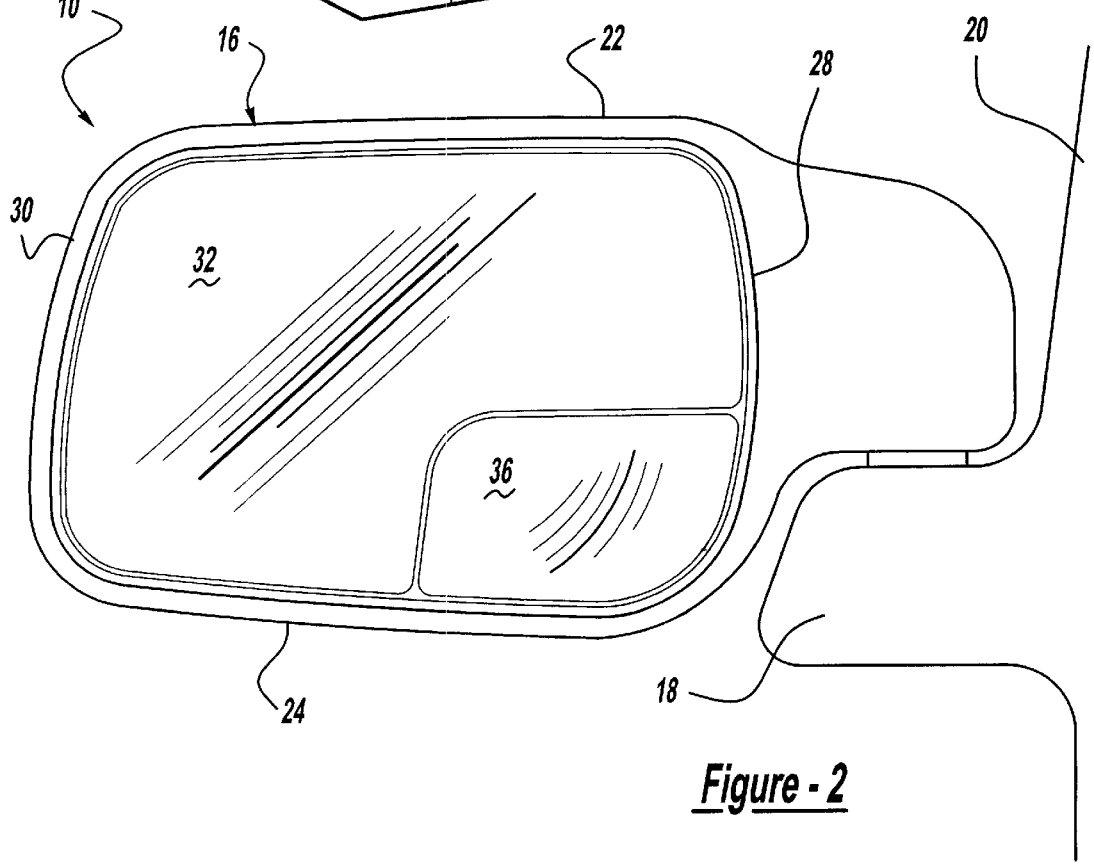
FIG. 2 is a front view of the mirror assembly of FIG. 1.

With reference to the drawings, and FIGS. 1–5 in particular, there is shown an exterior rear view mirror assembly indicated generally at 10 installed on the door 12 of a motor vehicle 14. Mirror assembly 10 is of the typical breakaway design and includes a housing 16 pivotally supported on an arm 18 extending outwardly from a generally triangular shaped mounting plate 20. Preferably, two mirror assemblies 10 will be mounted on vehicle 14, one of each side thereof to provide rearward and sideward fields of view with respect to the vehicle for the driver.

Housing 16 may be of any desired shape and includes an upper wall portion 22, a lower wall portion 24, a forwardly facing wall portion 26, an inner wall portion 28, and an outer wall portion 30, all of which merge smoothly together so as to present a pleasing appearance. The rearwardly facing portion of housing 16 is open and adapted to receive a first reflective element 32. First, reflective element 32 is preferably a flat mirror to provide a generally unaltered field of view to the user. A suitably shaped support member or multi-function backing plate 34 is secured within housing 16 and serves to movably support first reflective element 32 within the opening. First reflective element 32 may be implemented upon a glass or plastic substrate, each substrate receiving a reflective coating in accordance with techniques known to those skilled in the art.

In addition to first reflective element 32, support member or multi-function backing plate 34 also supports a second reflective element 36. In accordance with one aspect of the present invention, support member or multi-function backing plate 34 is a multi-function backing plate in which the backing plate structure performs more than one function. As will be described herein, the multi-function backing plate supports standard and wide angle reflective elements as well as various light structures. Second reflective element 36 is typically referred to as a spotter mirror or fisheye mirror and preferably provides a wide angle of view of the area rearward and sideward of the vehicle. Second reflective element 36 is preferably a convex shape to provide the desired wide angle field of view.

Figure 3:
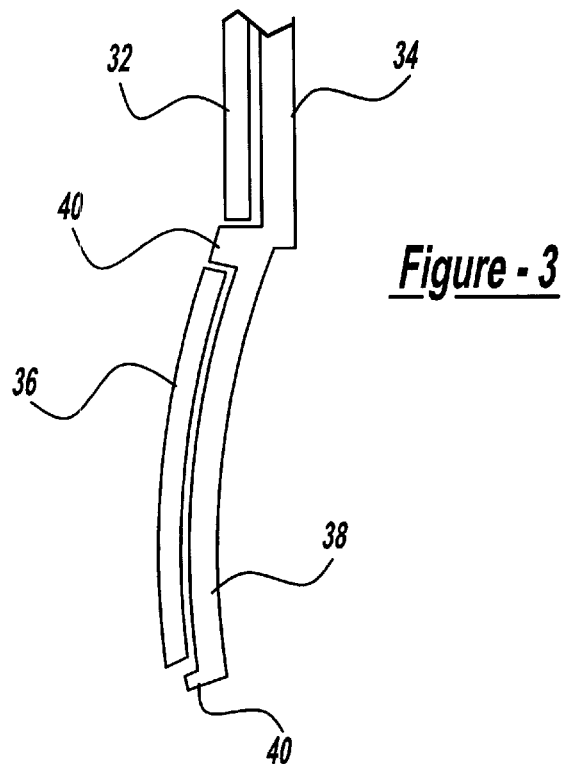
FIG. 3 is a crosssectional view of the mirror assembly of FIGS. 1 and 2 having a spot mirror fixed with respect to the multi-function backing plate.

As best seen in FIG. 3, spotter mirror or second reflective element 36 is supported by multi-function backing plate 34. Multi-function backing plate 34 preferably includes an integral spotter support section 38 which is shaped to the desired shape of second reflective element 36. Second reflective element 36 preferably attaches to spotter support section 38 using adhesive or other fastening means or may be mechanically held in place between ears 40.

Alternatively, second reflective element 36 may be implemented by utilizing a chrome plated plastic formulation to define second reflective element 36. In such a configuration, the plastic substrate is applied directly to multi-function backing plate 34 as a coating. Multi-function backing plate 34 may include suitable drive motors and the like for remote control adjustment of first reflective element 32 and second reflective element 36 as well as appropriate heating elements to provide defogging and deicing capabilities.

Figure 4:
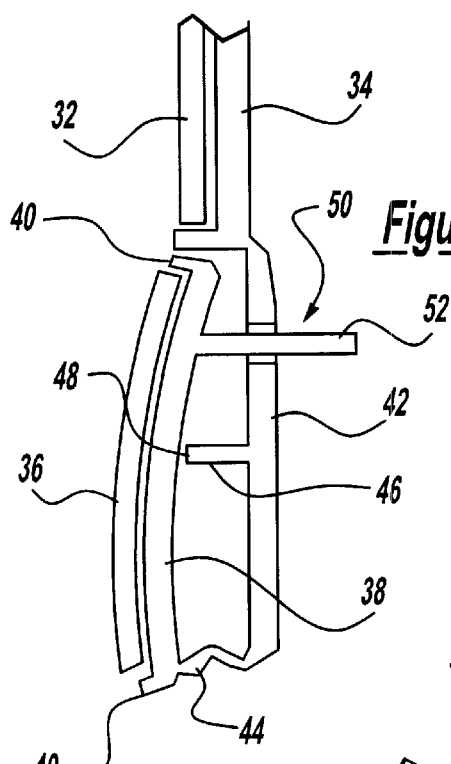
FIG. 4 is a crosssectional view of the mirror assembly of FIGS. 1 and 2 having an adjustable spot mirror.
Figure 5:
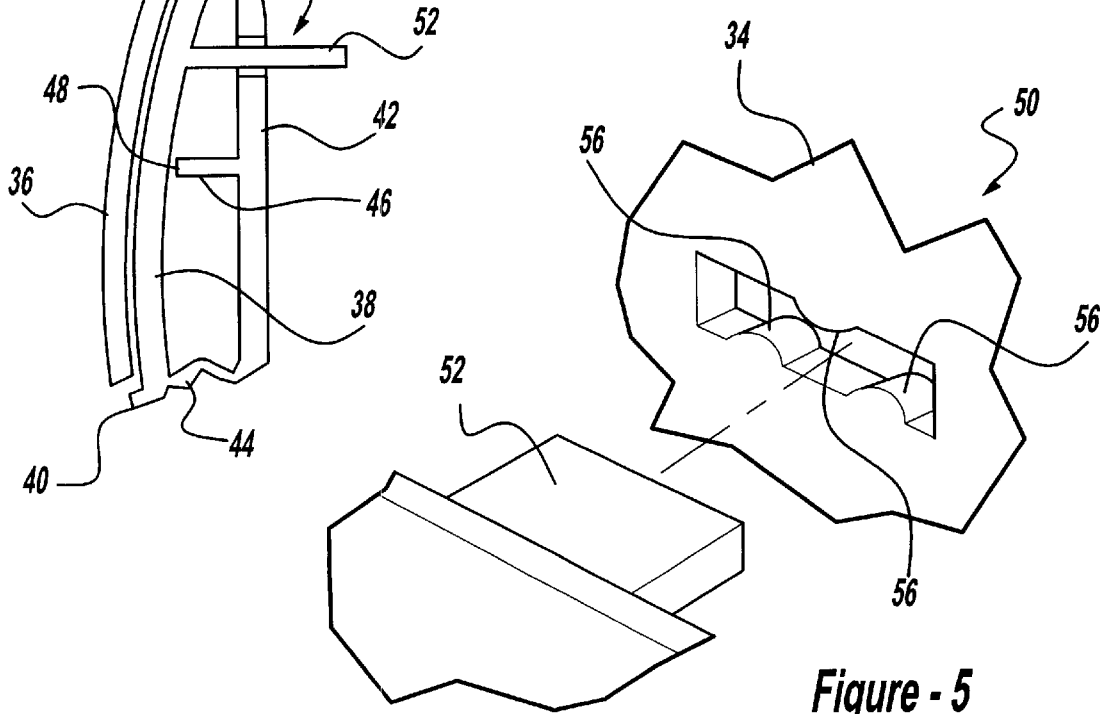
FIG. 5 is a perspective view of the dampener assembly for the adjustable spot mirror of FIG. 4.

FIGS. 4 and 5 depict an embodiment of mirror assembly 10 in which the orientation of second reflective element or spotter mirror 36 is adjustable with respect to first reflective element 32. With reference to FIGS. 4 and 5, spotter support section (a first wall) 38 attaches to an extension member (second wall) 42 of support member 34. Spotter support section 38 attaches to extension member 42 via a bellows or flexible hinge 44, also known as a living hinge. It should be noted that support member 34, support section 38, extension member 42, and hinge 44 may but need not, be integrally formed. A post (cantilever member) 46 projects from extension member 42 and provides a cantilever point for spotter support section 38. Preferably, hinge 44 is a bellows-type hinge which extends and retracts in accordance with movement of spotter support section 38 about post 46. Thus, spotter support section 38 and attached second reflective element 36 pivot about a horizontal axis defined by an end 48 of post 46.

FIGS. 4 and 5 also depict a blade type dampener assembly 50. Dampener assembly 50 includes a blade 52 which extends from spotter support section 38 rearwardly through extension member 42. Blade 52 extends through opening 54, which includes friction members 56. Friction (or retention) members 56 provide an interference fit with blade 52 thereby resisting movement about post 46.

By simply pressing upon different positions of second reflective element 36, the operator may adjust the orientation of second reflective element 36 about a horizontal axis independently of first reflective element 32. As arranged in FIGS. 4 and 5, second reflective element 36 may be adjusted in an upward and downward direction about a horizontal axis in order to provide a wide field of view in a vertical direction. Conventionally, such spotter mirrors have a relatively wide horizontal fields of view and horizontal adjustability need not necessarily be provided. However, one skilled in the art will yet recognize that a similar configuration can be provided to enable adjustability in the horizontal field of view. Further, second reflective element 36 may be adjusted using a motorized mechanism or mechanical linkage operated from remotely within the vehicle.

Figure 7:
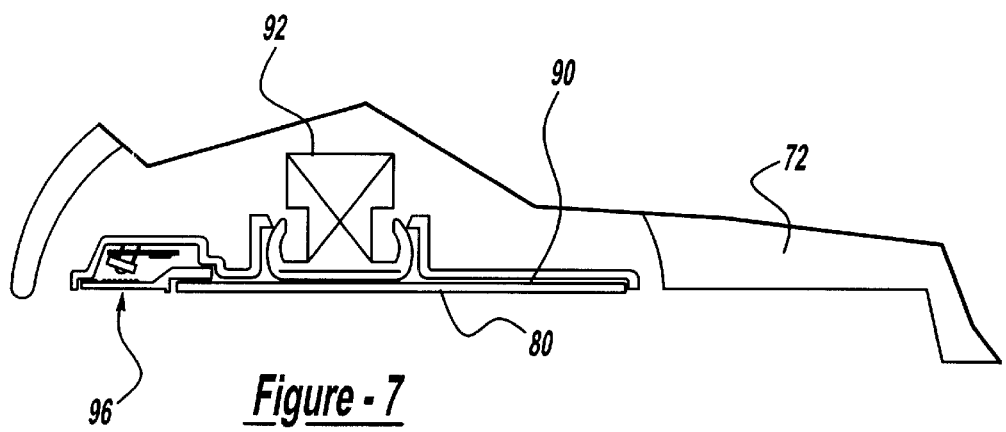
FIG. 7 is a crosssectional view of the mirror assembly taken along the lines 7—7 of FIG. 6.
Figure 8:
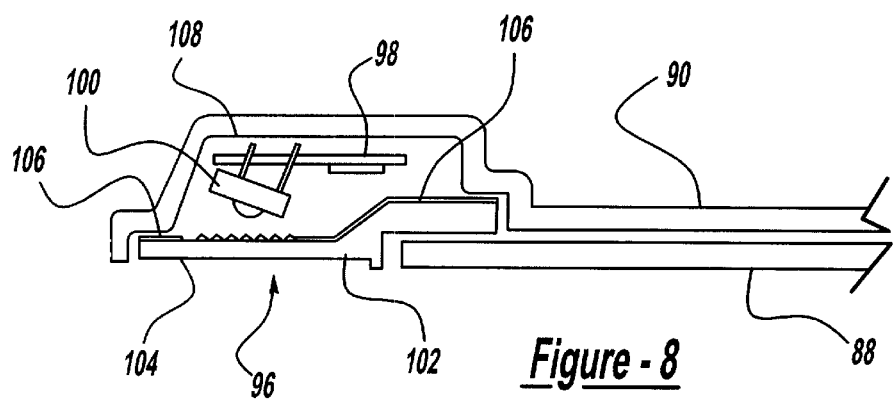
FIG. 8 is an expanded view of the indicator light assembly of FIG. 7.
Figure 9:
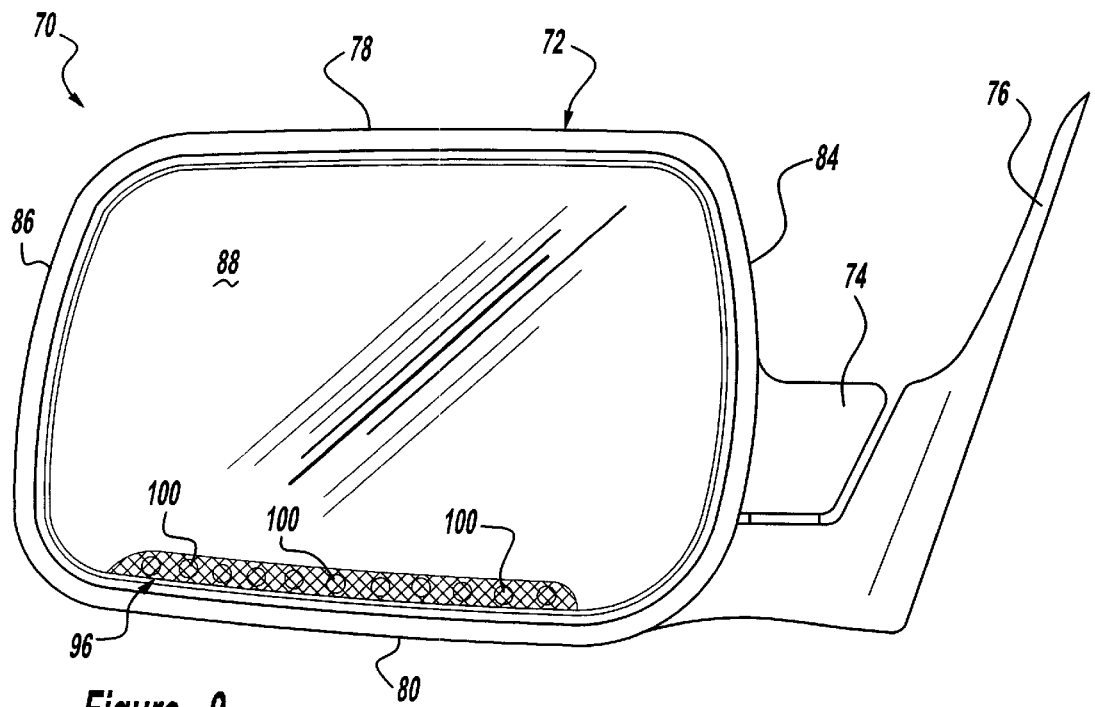
FIG. 9 is a front view of a mirror assembly having an indicator light assembly formed on the multi-function backing plate beneath the reflective element arranged in accordance with the principles of the present invention.

With reference to FIGS. 6–12, a mirror assembly 70 is arranged in accordance with an additional embodiment of the present invention. Mirror assembly 70 is shown as an exterior rear view mirror assembly installed on the door, such as door 12, of a motor vehicle 14 of FIGS. 1–2. Mirror assembly 70 is a typical design, may be either fixed or breakaway, and includes a housing 72 which may be fixed or pivotably supported upon an arm 74 extending outwardly from a mounting plate 76, as shown in FIG. 9.

Housing 72 may be of any desired shape and includes an upper wall portion 78, a lower wall portion 80, a forwardly facing wall portion 82, an inner wall portion 84, and an outer wall portion 86, all of which merge smoothly together so as to present a pleasing appearance. The rearwardly facing portion of housing 72 is open and is adapted to receive a reflective element 88, such as a mirror. Reflective element 88 may be any suitable type such as a flat, concave, convex, or other type which automatically adjusts to reduce glare. Preferably, reflective element 88 is a flat mirror.

A suitably shaped support member or multi-function backing plate is secured within housing 72 and serves to movably support reflective element 88. Multi-function backing plate 90 include one or a plurality of suitable drive motors 92 and the like for remote control adjustment of reflective element 88 as well as heating elements for heating the mirror if desired. With respect to FIGS. 10–12, multi-function backing plate 90 also optionally supports a second reflective element 94, such as a spotter or fisheye mirror, which provides a wider field of view than reflective element 88. Particularly, multi-function backing plate 90 supports reflective element 88, and optional second reflective element 94, and a light assembly, as will be further described herein.

The selection of the particular substrate of each of the reflective elements 88 and 94 (of FIGS. 10–12) may be made in accordance with similar considerations discussed above with respect to FIGS. 1–5.

A particular feature of the present invention is the inclusion of an indicator light assembly 96 which is supported by multi-function backing plate 90. Indicator light assembly 96 may provide any of a number of predetermined light indicator signals, including a side marker light, a brake light, a turn signal light, and the like. As best seen in FIGS. 7 and 8, indicator light assembly 96 includes a light support 98, such as a printed circuit board. Light support 98 receives one or a plurality of light sources 100 which project light when energized. The projected light is output through a lens 102. Lens 102 may be formed to disburse light or more sharply focus light, depending on the particular design considerations. Lens 102 includes a focusing portion, such as a prism 104, to accomplish the focusing function, and also includes a blacked out opaque portion 106. The blacked out portion 106 prevents escape of light from selected sections of lens 102. The interior surface 108 of multi-function backing plate 90 is metallized to assist in projecting light through lens 102.

Light source 100 may include of one or a plurality of light sources, such as LEDs or incandescent lamps. Incandescent scent lamps may generally be suitably substituted for LEDs as described herein with modifications as may be required. As best seen in FIGS. 9–12, one or a plurality of light sources 100 may be aligned within indicator light assembly 96. Light sources 100 may be operated simultaneously to output light through the entirety of lens 102. Alternatively, light sources 100 may be activated sequentially to provide a strobe effect. For example, with respect to FIG. 9 and 12, sequential operation of light sources 100 in a right to left direction, when mirror assembly 70 is mounted on the driver's side, may be used to indicate a left turn signal. Other alternative strobing arrangements may also be implemented.

Figure 6:
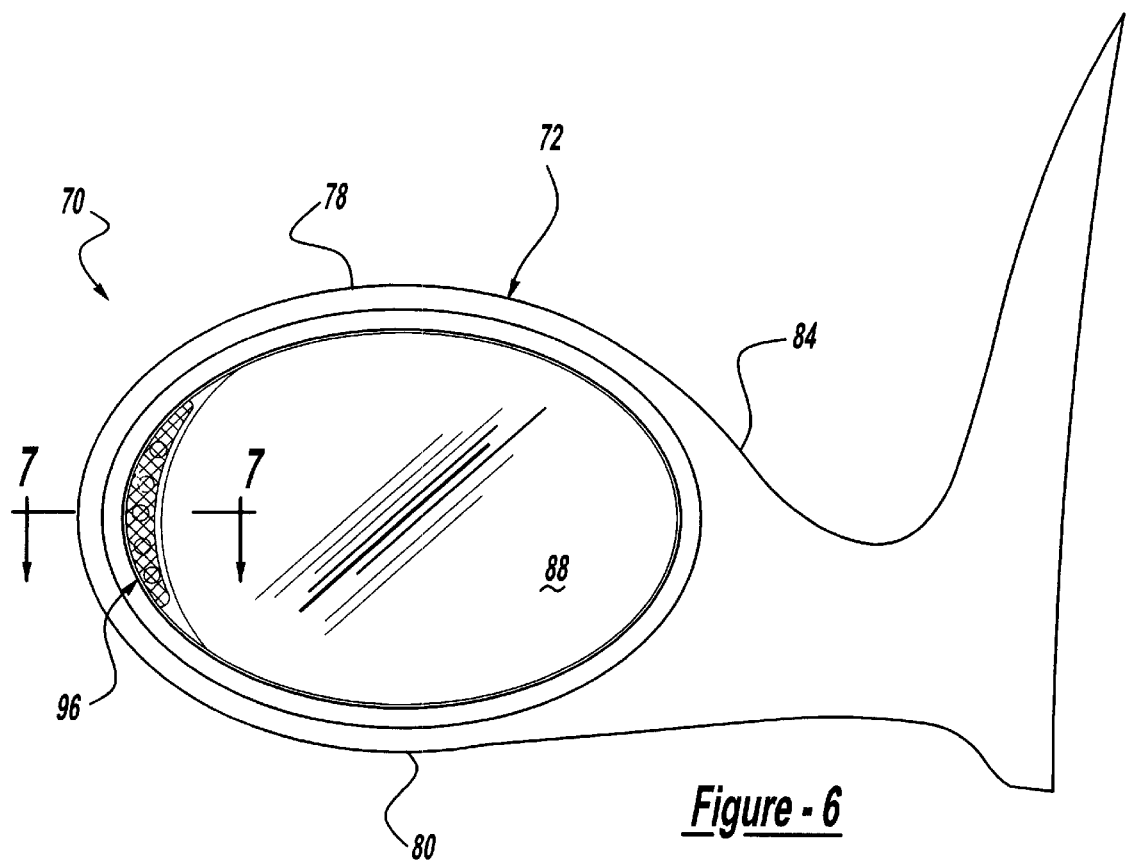
FIG. 6 is a front view of a mirror assembly including a multi-function backing plate having an indicator light assembly arranged in accordance with the principles of the present invention.
Figure 11:
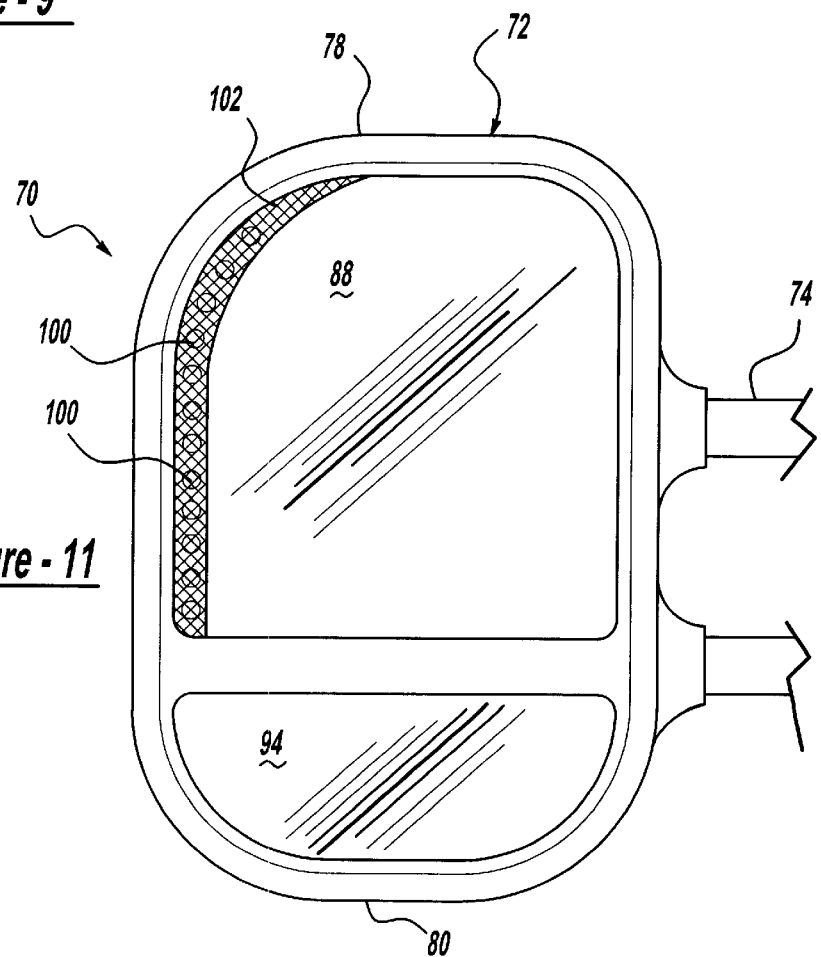
FIG. 11 is a front view of a mirror assembly having an indicator light assembly placed on the multi-function backing plate of the mirror assembly beside the reflective element, including a spotter element below the reflective element.
Figure 10:
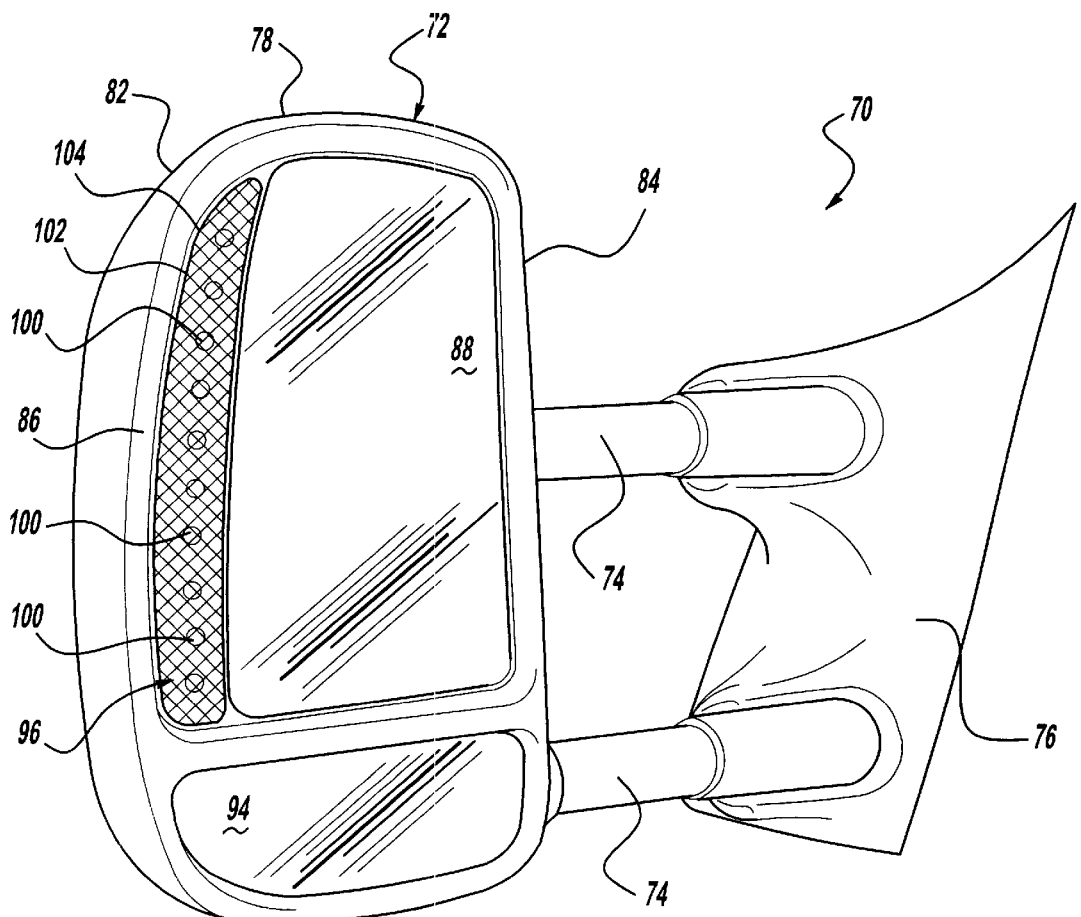
FIG. 10 is a perspective view of a mirror assembly having a conventional reflective element, a spotter reflective element, and an indicator light assembly beside the conventional reflective element.
Figure 12:
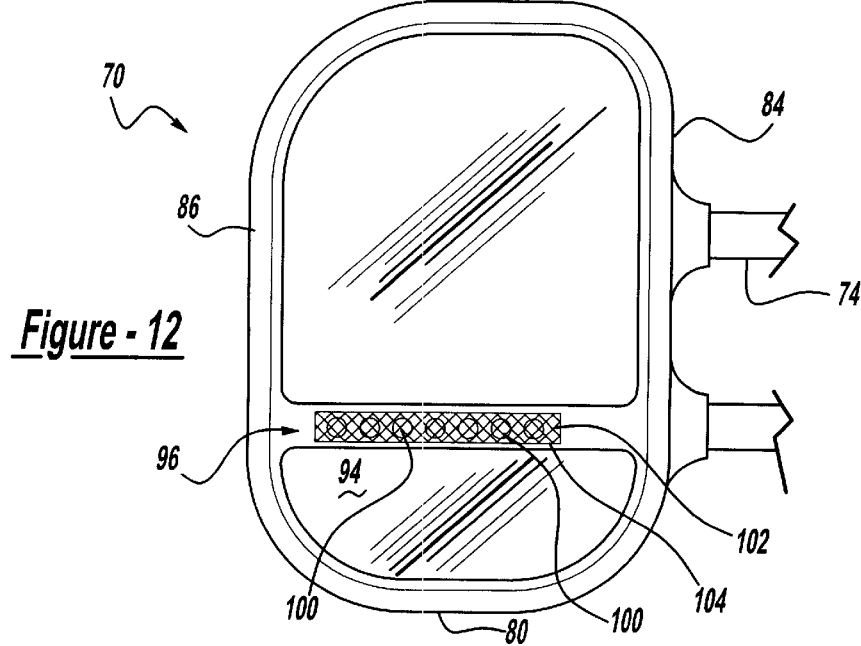
FIG. 12 is a front view of a mirror assembly having an indicator light assembly placed between the reflective element and the spotter element arranged in accordance with the principles of the present invention.

With particular respect to FIGS. 6, 11, and 10, mirror assembly 70 is generally configured for attachment to the left side of the vehicle. In each configuration, indicator light assembly 96 is located towards the outside, or to the left of reflective element 88. One skilled in the art, however, will recognize that a symmetric configuration may be implemented for mirrors attached to the right side of the vehicle. Alternatively, light assembly 96 may be disposed inboard of reflective element 88. With respect to FIGS. 9 and 12, indicator light assembly 96 is located beneath reflective element 88. However, one skilled in the art will recognize that indicator light assembly 96 could be disposed above reflective element 88. With particular respect to FIG. 12, indicator light assembly 96 is further disposed between reflective elements 88 and 94.

Further yet, one skilled in the art will recognize that indicator light assembly 96 can also be disposed above, below, or adjacent to spotter glass 94, which may be adjusted as described above. Such a configuration may be in conjunction with or in place of disposition in proximate to reflective element 88.

Figure 13:
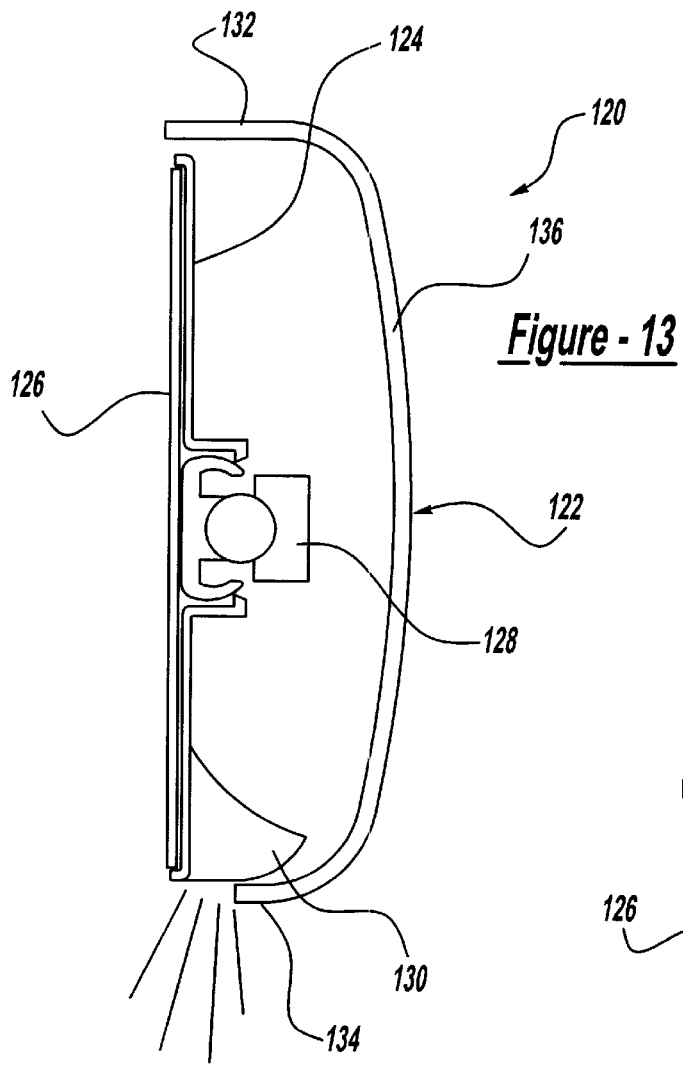
FIG. 13 is a horizontal, crosssectional view of a mirror assembly having an adjustable approach light arranged in accordance with the principles of the present invention.
Figure 14:
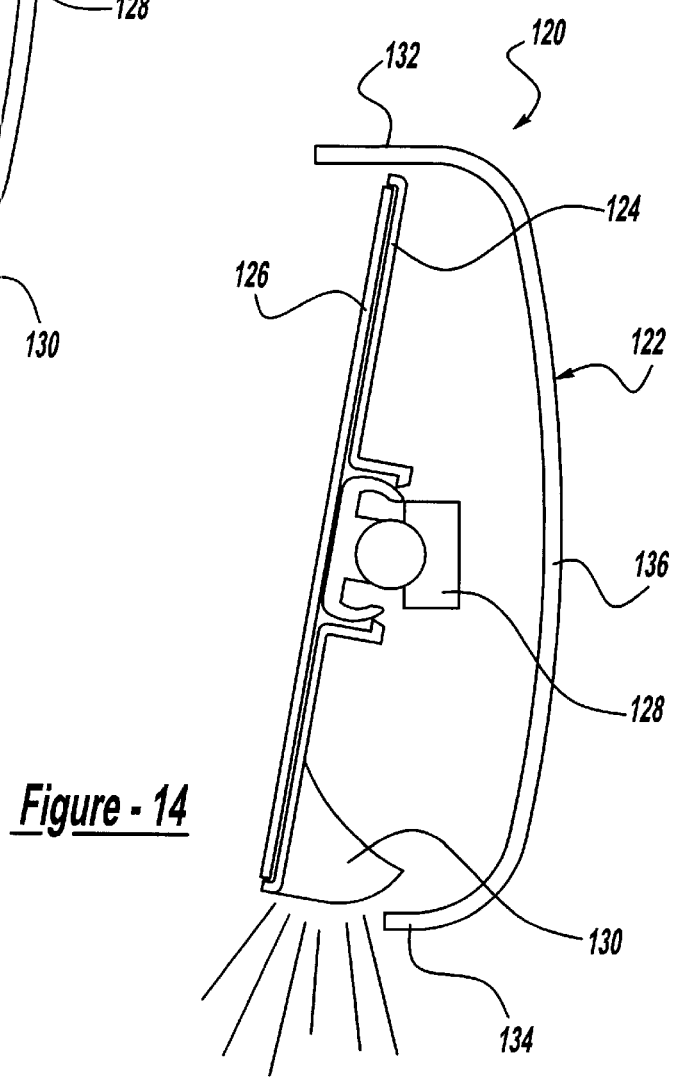
FIG. 14 is a horizontal, crosssectional view of the mirror assembly of FIG. 13 with the approach light in an exposed position.
Figure 15:
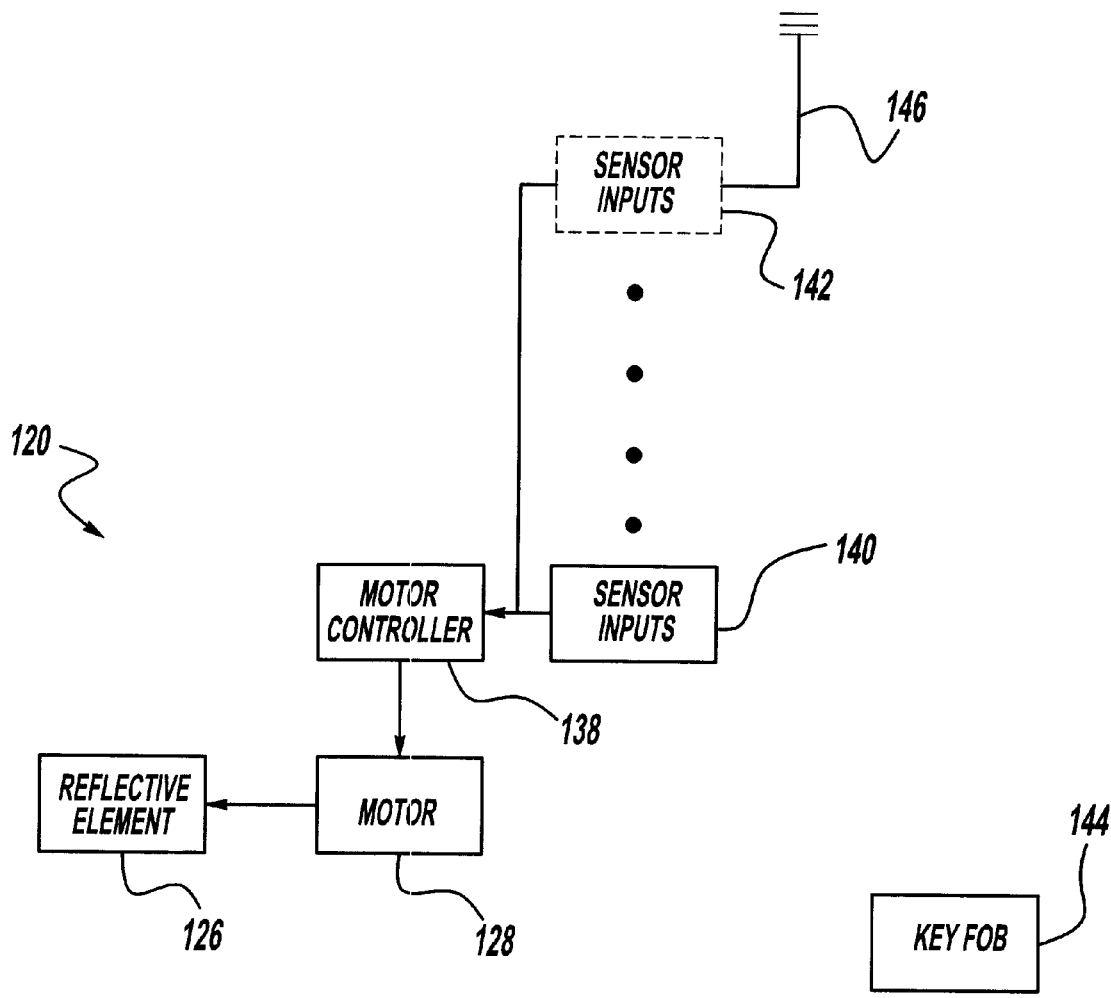
FIG. 15 is a block diagram of a control system for a smart mirror system, particularly for operating the mirror assembly of FIGS. 13 and 14.

With respect to FIGS. 13–15, yet another embodiment of the present invention will be described. FIGS. 13–15 are particularly directed to the use of an approach or spot light disposed on the backing plate for selective use by rotating the mirror so as to expose the approach light. FIGS. 13 and 14 depict a mirror assembly 120. Mirror assembly 120 is arranged similarly to the embodiments described above with respect to FIGS. 1–12. Mirror assembly 120 described herein, however, does not include a spotter or fisheye reflective element described above with respect to FIGS. 1–12. One skilled in the art, however, will recognize that the principles discussed herein with respect to FIGS. 13–15 apply equally to a mirror assembly having one or both of a regular angle and a wide angle reflective element.

Mirror assembly 120 includes a housing 122. Housing 122 carries a support member or multi-function backing plate 124. Multi-function backing plate 124 in turn supports a reflective element 126 which faces outwardly from an opening of housing 122. Reflective element 126 may be arranged in accordance with the reflective elements described above with respect to FIGS. 1–12. Support member or multi-function backing plate 124 includes a suitable drive motor 128 and the like for remote control adjustment of the mirror as well as means for heating the mirror if desired. Alternatively to drive motor 128, support member 124 may include an alternative adjustment means to displace multi-function backing plate 124. Attached to the rear and toward the bottom of the backing plate is an approach light or lamp 130. Approach light or lamp 130 is arranged to project light in a generally downward direction. Alternative projection directions, such as outward from the vehicle may also be utilized.

Housing 122 includes a upper wall portion 132, a lower wall portion 134, and a forwardly facing wall portion 136, all of which merge smoothly together so as to present a pleasing appearance. When multi-function backing plate 124 and attached reflective element 126 are oriented as shown in FIG. 13, lower wall portion 134 obscures light projecting from approach light or lamp 130. FIG. 13 is indicative of a position desirable when the vehicle is in operation. FIG. 14 depicts multi-function backing plate 124 and attached reflective element 126 rotated to a generally upward facing position. In this position, lower wall portion 134 no longer obscures the projection of light from approach lamp 130. Thus, mirror assembly 120 of FIGS. 13 and 14 provides a recessable approach light. Further, because operation of approach light preferably occurs when the vehicle is not operating, the multi-function backing plate 124 and attached reflective element 126 can be displaced to expose the approach light at such convenient times as when the driver enters or exits the vehicle. In a particular implementation, approach light 130 may function as a reverse light when multi-function backing plate 124 and attached reflective element 126 are angled sufficiently upward to project light rearwardly.

FIG. 15 depicts a control system for operating mirror assembly 120 of FIGS. 13 and 14. As discussed above, mirror assembly 120 includes a reflective element 126. Also as discussed above with respect to FIGS. 13 and 14, a motor 128 enables displacement of multi-function backing plate 124 and attached reflective element 126. A motor controller 138 provides control signals to motor 128 in order to displace reflective element 126 as desired. Motor controller 138 receives input signals from one or a plurality of sensors 140 and 142. For example, sensors 140 and 142 may provide status signals to motor controller 138 in accordance with a position of the ignition, position of doors, input from a remote key fob 144, and the like. For example, key fob 144 may generate an infrared (IR) signal detected by detector 146. Sensor 142 receives the signal sensed by detector 146 and generates an input signal to motor controller 138.

FIG. 15 enables automatic operation of the mirror assemblies described with respect to FIGS. 1–14. With particular respect to FIGS. 13 and 14, motor controller 138 may include memory to store various operating positions corresponding to particular users and to store various mirror positions prior to utilizing the approach light. For example, approaching the vehicle, the operator may use key fob 144 to initiate a signal to unlock the doors. The signal may be input to motor controller 138 to displace multi-function backing plate 124 and attached reflective element 126 in a generally upward direction, thereby exposing approach light 130 to illuminate the area around the vehicle to increase the safety and personal protection of the operator approaching the vehicle. Once the operator has entered the vehicle and closes the door and/or, inserted the key into the ignition, motor controller 138 detects such conditions from sensors 140, 142 and returns multi-function backing plate 124 and attached reflective element 126 to an operative position in accordance with the position of these elements prior to displacement to expose approach light 130, or in accordance with key fob signals or other operator identification. Further, motor controller 138 may sense when the vehicle is in reverse and rotate multi-function backing plate 124 and attached reflective element 126 to fully direct approach light 130 rearwardly as a reverse light.

FIGS. 16 and 17 depict yet another embodiment of the present invention in mirror assemblies 150 and 152. As with all Figures described herein and mirror assemblies 150, 152, like components for each mirror assembly will be referred to using like reference numerals. In particular, mirror assemblies 150, 152 include a housing 154. Housing 154 is supported and configured externally generally as described above with respect to FIGS. 1–15. As described above, housing 154 may be of any desired shape and includes, as described above, an outer wall portion 156, an inner wall portion 158, and a forwardly facing wall portion 160, all of which merge smoothly together so as to present a pleasing appearance. Housing 154 includes an open end and is adapted to receive a reflective element (not shown in FIGS. 15 and 16). The reflective element may be any of the reflective elements as described above in FIGS. 1–15.

A suitably shaped support member or multi-function backing plate 188 is secured to housing 154 and serves to movably support the reflective element within the opening of the housing 154. The support member or multi-function backing plate 188 may include suitable drive motors and the like (not shown) for remote control adjustment of the mirror as well as means for heating the mirror if desired, as described above.

A particular feature of FIGS. 16 and 17 is the inclusion of an indicator light assembly 162 in FIG. 16 and 164 in FIG. 17. Light assemblies 162 and 164 generally define a globe technology design in which a light pipe transfers light from a light source or globe placed within housing 154 to an outboard end of housing 154. The indicator light assembly may perform any of the functions described above with respect to FIGS. 1–15, and may particularly perform a side repeater function.

Indicator light assembly 162, 164 includes a light source or globe 166. Light source 166 includes a bulb holder 168 which is inserted into a reflector 170, the interior of which is preferably metallized or coated with a reflective material to collect light projected from the globe and focus it into a light pipe, as will be described herein. Metallized reflector 170 is preferably fastened to, such as through vibration welding, to a light assembly housing 172 at joint 174. Light passes through the light assembly housing 172, which also may be coated with metallized material, and enters light pipe 176. Light pipe 176 may be a clear or colored light pipe and extends into a lens 178. Light pipe 176 may include prism formations on the inner surfaces to deflect light through lens 178 to provide a cosmetic function or a selected indicator light function. As shown herein, lens 178 may form a portion or the entirety of outer wall portion 156 and forwardly facing wall portion 160. Lens 178 may have selected opaque sections so that lens 178 outputs a particular, illuminated design. Light traverses light pipe 176 and exits in a generally sideward rearward direction through port 180. Port 180 is shaped to provide a predetermined angle of dispersion 182 which may be selected in accordance with safety standards of particular countries. Port 180 may also include a colorized lens to output light of a predetermined color.

FIGS. 16 and 17 differ in that light pipe 176 of FIG. 15 defines a conventional light pipe design. Particularly, light pipe 178 of FIG. 16 is formed of material which transports light. Light pipe 178 of FIG. 17, on the other hand, is formed by placing a metallized coating on opposing surfaces of housing 172 and lens 178. In particular, a first metallized coating 184 is formed on housing 172, and a second metallized coating 186 is formed on lens 178 on a surface opposing metallized coating 184. Metallized coatings 184 and 186 cooperate to reflect light projected from globe 166 through to port 180. Note that in order for indicator light assembly 164 of FIG. 17 to emit light through lens 178 in a generally forward direction, as described in FIG. 16, metallized coating 186 must have some transparent properties as well. Lens 178 functions and has features as described above with respect to FIG. 17.

Figure 20:
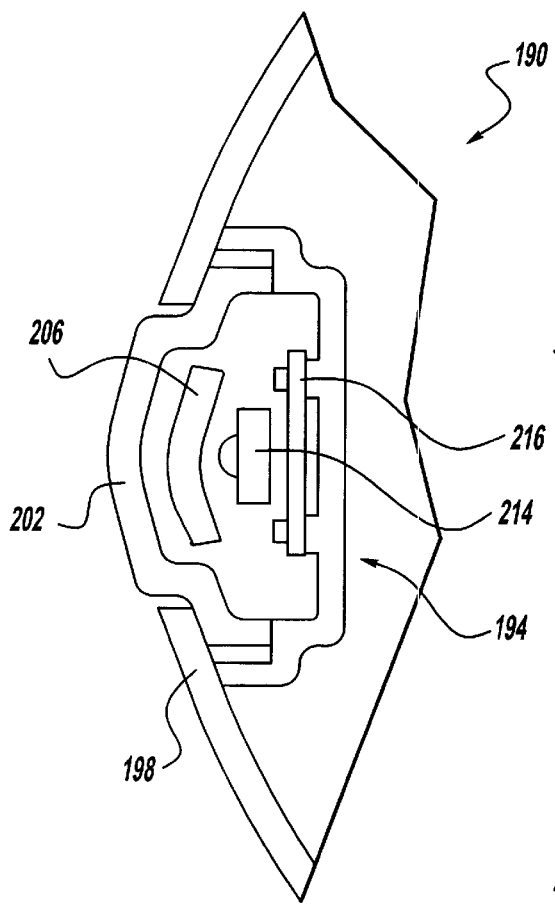
FIG. 20 is a crosssectional view taken along the lines 20-20 of FIG. 18.

FIGS. 18–20 depict crosssectional views of a mirror assembly 190 utilizing in combination the LED and the light pipe concepts described above with respect to FIGS. 1–17 to provide an indicator function, particular a side area for function by enabling light to traverse toward an outboard end of the housing. FIGS. 18–20 include a first indicator light assembly 192 and a second indicator light assembly 194. First indicator light assembly 192 utilizes a light pipe to project light in an outboard direction, such as may be used for an approach light. Second indicator light assembly 194 may be utilized for a forward facing indicator light, such as a turn signal, other indicator light, or simply a cosmetic light function formed on a forwardly facing surface of mirror assembly 190. It should be noted from the outset, that mirror assembly 190 may be configured as any of the mirror assemblies described above with respect to FIGS. 1–17. Particularly, mirror assembly 190 includes a mirror housing 196 having a forwardly facing wall portion 198. Mirror assembly 190 supports a reflective element as described above.

With respect to first indicator light assembly 192, first indicator light assembly 192 includes a light assembly housing 200 which supports a forwardly facing lens 202. First indicator light assembly 192 includes a plurality of light sources or globes 204 which project light into light pipe 206. Light pipe 206 transports the projected light to an opening or port 208 which projects light in a generally outboard direction in accordance with predetermined specifications which define an angle or sweep 210 of the output light. The angle or sweep in a generally rearward and outboard direction. Light pipe 206 is embodied as a light pipe which is conventionally known in the art. In proximity to light sources 204, light pipe 206 is supported by projection 212 which extends inwardly from housing 200.

With respect to second indicator light assembly 194, a plurality of LEDs or incandescent lights 214 are supported upon a printed circuit board 216. LEDs 214 cooperate to project light in a forward direction through lens 202. As embodied herein, LEDs 214 provide a cosmetic or decorative illumination function. However, LEDs 214, or other light sources, may be configured to provide a forward facing vehicular light signal. As described with respect to FIGS. 16 and 17, lens 202 can include opaque portions to illuminate a logo or other design when utilized in a cosmetic application.

FIGS. 21–24 depict yet another embodiment of the present invention. Particularly, FIGS. 21–24 depict a mirror assembly 230 arranged in a modular design. The modular design includes a primary section which defines the mirror and the support portions of the mirror and also includes an indicator light assembly pod which may also include a spotter mirror.

Figure 21:
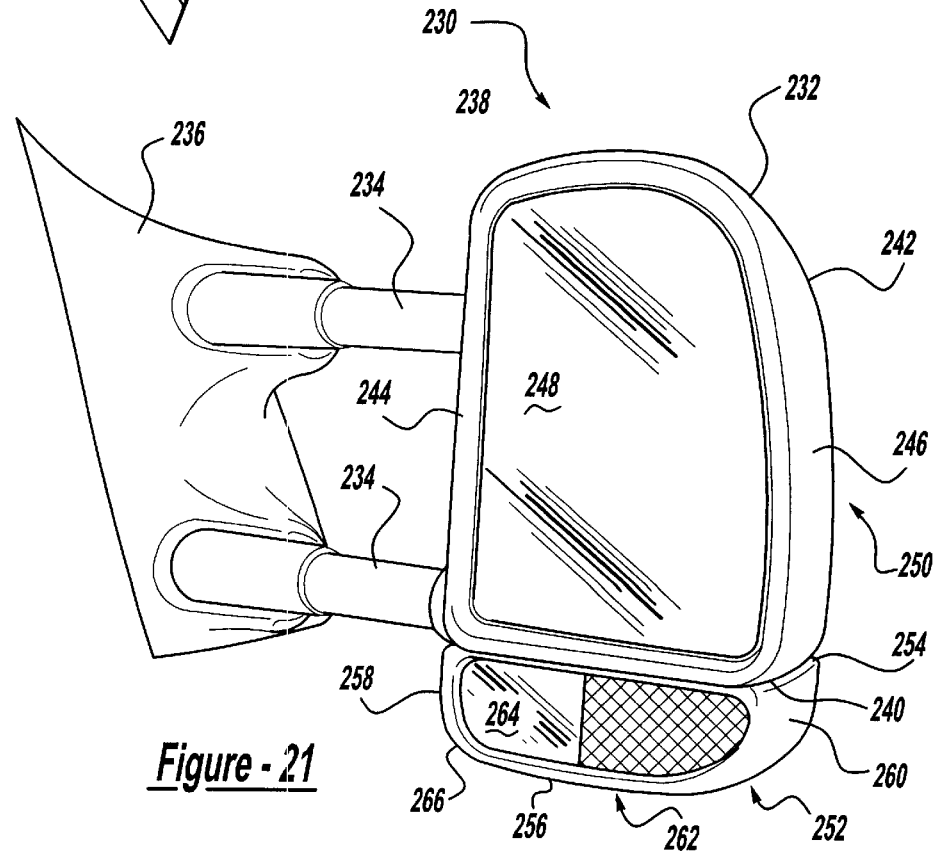
FIG. 21 is a perspective view of a modular mirror assembly having a light indicator pod arranged in accordance with the principles of the present invention.

Mirror assembly 230 includes a housing 232 supported upon a pair of arms 234 extending outwardly from a generally triangularly shaped mounting plate 236 which is attached to the vehicle. Housing 232 may be of any desired shape and includes an upper wall portion 238, a lower wall portion 240, a forwardly facing wall portion 242, an inner wall portion 244, and an outer wall portion 246, all of which merge smoothly together so as to present a pleasing appearance. The rearwardly facing portion of housing 232 is open and adapted to receive a first reflective element 248. The portions of mirror assembly 230 described thus far may be referred to as a primary module 250 of modular mirror assembly 230. A secondary or indicator light assembly module or pod assembly 252 may be attached to primary module 250. As shown in FIG. 21, secondary module 252 attaches to lower wall portion 240, of primary module 250.

Secondary module 252 includes an upper wall portion 254, a lower wall portion 256, an inner wall portion 258, and an outer wall portion 260, all of which merge smoothly together so as to present a pleasing appearance. Preferably, the shape of secondary module 252 compliments the shape of primary module 250. The rearwardly facing portion of the housing 266 of secondary module 252 is open and is adapted to receive an indicator light assembly 262. A rearwardly facing wall 264 of secondary module 252 may be configured to receive a reflective element. Secondary module 252 attaches to primary module 250 using fasteners such as screws or conventional, integral plastic cups and are abutted so that the lower wall portion 240 of primary module abuts with upper wall portion 254 of secondary module 252.

Figure 22:
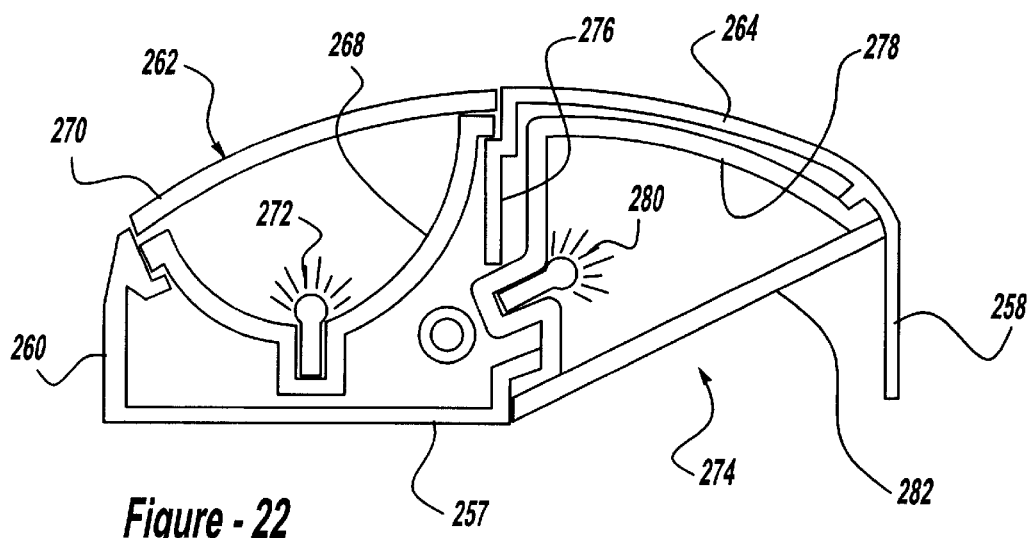
FIG. 22 is a horizontal crosssectional top view of the light indicator pod of FIG. 21.
Figure 23:
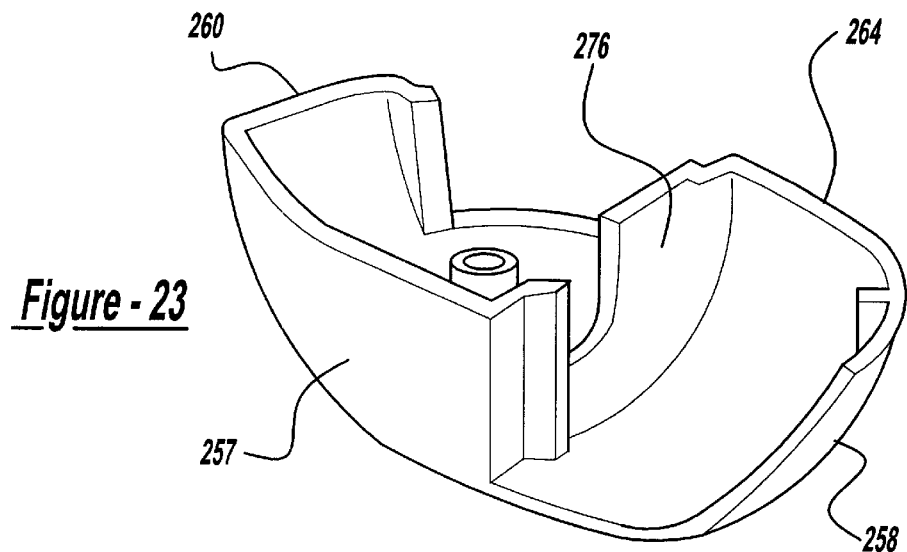
FIG. 23 is a perspective view of the light indicator pod of FIG. 21.
Figure 24:
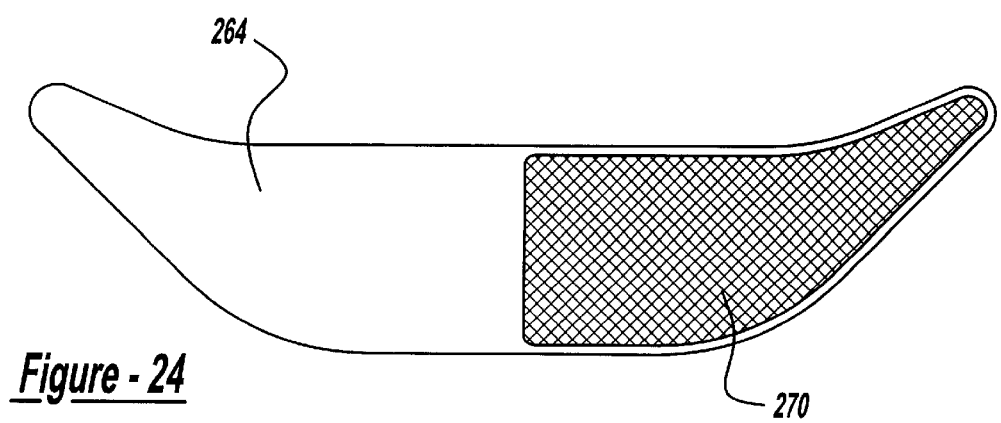
FIG. 24 is a front view of the light indicator pod of FIG. 21.

FIGS. 22–24 depict various views of secondary pod 252. With reference to FIG. 22, which shows a horizontal crosssection, indicator light assembly 262 includes a reflective surface 268 which is coated with a reflective coating. Indicator light assembly 262 also includes a lens 270, such as a clear lens for projecting light in a forward direction. Lens 270 may be colorized in accordance with the particular function to be effected by indicator light assembly 262. A light source 272 provides light which reflects off of reflective surface 268 and through lens 270.

Secondary module 252 also includes a second indicator light assembly 274 mounted between rearwardly facing wall portion 264, inner wall portion 258, and intermediate wall portion 276. Second indicator light assembly 274 includes a reflective surface 278 and a light source 280. Light source 280 projects light that reflects off of reflective surface 278 and through lens 282. Lens 282 is preferably a polycarb lens and may be colorized in accordance with the particular light signal indication to be provided by second indicator light assembly 274. For example, second indicator light assembly 274 may provide a turn signal function and may be colorized in a generally orange or red color.

Figure 25:
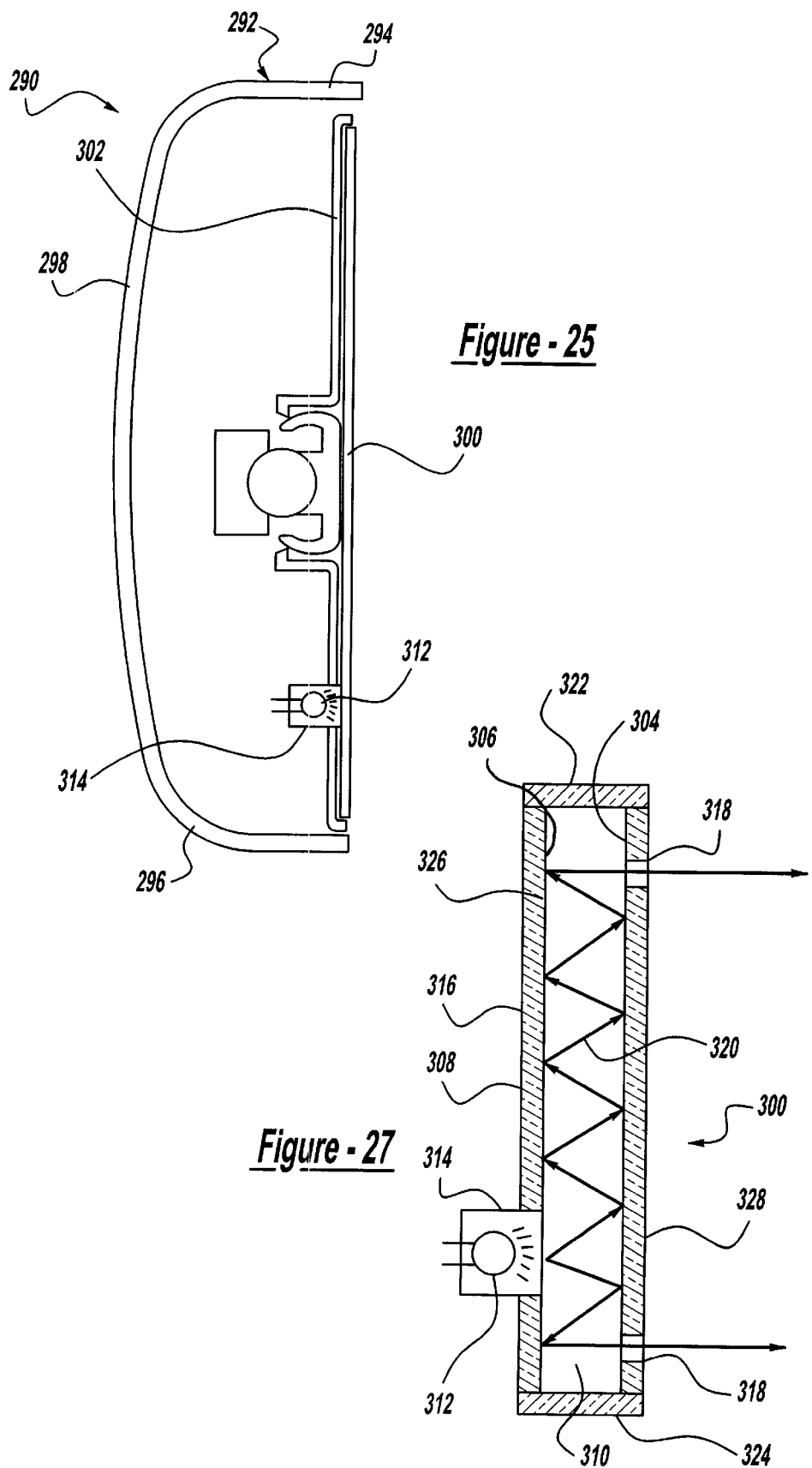
FIG. 25 is a vertical, crosssectional view of a mirror assembly in which the exterior of the mirror is coated with reflective material to provide a light pipe integrally formed with the mirror.
Figure 26:
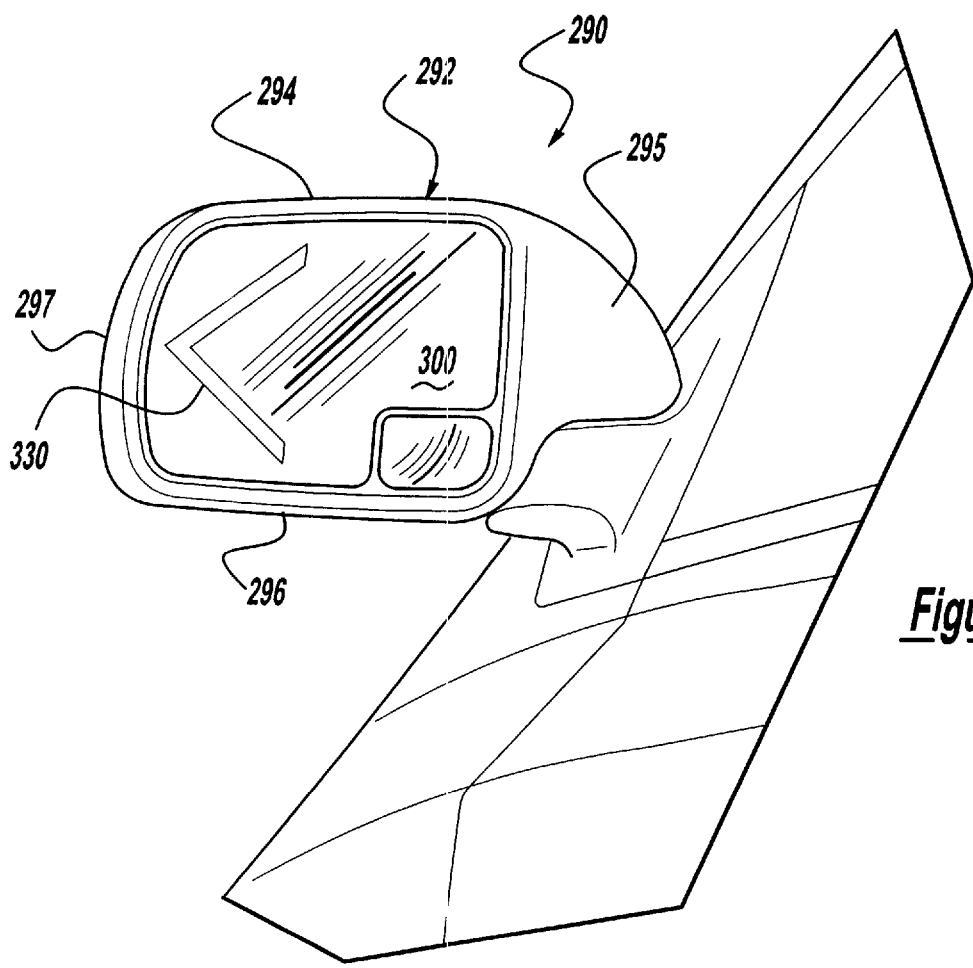
FIG. 26 is a front perspective view of the mirror assembly of FIG. 25.

In addition to the various embodiments for translating light from the light source to an exterior portion of the mirror assembly, FIGS. 25–27 depict yet another embodiment which utilizes reflective coatings applied to the reflective elements to provide a light pipe function. FIG. 25 depicts a crosssection of a mirror assembly 290. Mirror assembly 290 operates generally as described above with respect to FIGS. 1–24. Particularly, mirror assembly 290 includes a housing 292 pivotably supported upon an arm extending outwardly from a mounting plate attached to the vehicle. Housing 292 may be of any desired shape and includes an upper wall portion 294, a lower wall portion 296, a forwardly facing wall portion 298, and inner wall portion 295 and outer wall portion 297, all of which merge smoothly together so as to present a pleasing appearance. The rearwardly facing portion of housing 292 is open and is adapted to receive a reflective element 300. Reflective element 300 may be as described above with respect to FIGS. 1–24. A support member or multi-function backing plate 302 supports reflective element 300 within housing 292 and serves to movably support reflective element 300 within the opening. Multi-function backing plate 302 may include suitable drive motors and a light for remote control adjustment of the mirror as well as a heating element, if desired.

As best seen in FIG. 27, reflective element 300 has a rearwardly facing surface 304 and a forwardly facing surface 306. Under normal operation, if substrate 310 of reflective element 300 is glass, a reflective coating 308 applied to forwardly facing surface 306 provides the reflectivity for reflective element 300 to operate in a conventional manner. If substrate 310 is formed of plastic, a reflective coating 328 is formed on rearwardly facing surface 304 to provide the proper reflectivity for reflective element 300 to operate in a conventional manner.

In accordance with the present invention, a reflective coating is formed on each surface of substrate 310 to provide a light pipe function within substrate 310. A light source 312 is formed within a light source housing 314 to project light toward the interior of substrate 310. A reflective coating 316 is formed around the periphery of substrate 310 except for selected locations. These selected locations include where light source housing 314 attaches to substrate 310 to enable transmission of light into substrate 310. These selected areas also include predetermined holes or brakes 318 formed in reflective coating 316 to enable the escape of light. As best seen in FIG. 26, holes 318 are formed in the share of a chevron 330, as may be used to indicate a turn, or other useful information.

As shown in FIG. 27, light projecting from light source 312 reflects within substrate 310 due to the reflective coating 316 and exits at predetermined locations selected by placement of holes or brakes 318. Such holes or brakes enable transmission of light directly through substrate 310 so that reflective element 300 can effectively act as a indicator light assembly. Arrows 320 of FIG. 27 depict this function. One skilled in the art will recognize that the placement of holes can be varied in accordance with the particular function to be provided by the indicator light assembly. Further, various designs and/or configurations of the indicator light assembly may be selected, such as use of an arrow shaped indicator light assembly, formed by providing an arrow shaped hole or brake 318 in reflective coating 316 in order to provide a suitable indicator light pattern.

Reflective coating 316 comprises a coating applied to each exterior surface of substrate 310, except for selected areas. As shown in FIG. 27, reflective coating 316 includes an upper coating 322, a lower coating 324, a forwardly facing coating 326 and a rearwardly facing coating 328. In operation, where substrate 310 is a plastic substrate, typically only a rearward facing coating 328 would be applied to rearwardly facing surface 304. To provide a light pipe function, however, upper coating 322, lower coating 324, and forward facing coating 326 would also be applied to substrate 310 to provide a light pipe function. For a glass substrate 310, typically only forwardly facing coating 326 would be applied to substrate 310. However, to provide a light pipe function, upper coating 322, lower coating 324, and rearwardly facing coating 328 would also be applied to substrate 310. Further, rearwardly facing coating 328 must enable transmission of light in both directions to enable reflective element 300 to properly operate as a reflective element. Thus, rearward facing coating 328 preferably enables the bidirectional transmission of at least a portion of the light to provide proper operation as a reflective element.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A mirror assembly for a vehicle comprising:

a mirror housing;

a first reflective element having a first field of view;

a second reflective element having a second field of view, the second field of view being wider than the first field of view; and a backing assembly supported by the mirror housing, the backing assembly supporting the first reflective element and also supporting the second reflective element, the backing assembly including:

a first wall, wherein the first wall supports the second reflective element;

a second wall opposing the first wall; and a hinge interconnecting the first and second walls, the hinge being flexible to enable adjustment of a relative position between the first and second walls; wherein an orientation of the second reflective element is adjustable independently of the first reflective element in accordance with displacement of a portion of the backing assembly.

2. The mirror assembly of claim 1, further comprising a cantilevered member projecting from one of the first and second walls, the other wall being pivotable with respect to the cantilevered member.

3. The mirror assembly of claim 2, further comprising a retention member operatively connected to the second wall, the retention member opposing displacement of the first wall with respect to the second wall.

4. The mirror assembly of claim 1, wherein the second reflective element is formed of one of plastic and glass.

5. The mirror assembly of claim 1, wherein the first reflective element is formed of one of plastic and glass.

6. The mirror assembly of claim 1, wherein a portion of the first wall is formed in a desired shape of the second reflective element.

* * * * *

UNITED STATES PATENT AND TRADEMARK OFFICE
CERTIFICATE OF CORRECTION

| | | |
|---|---|---|
| PATENT NO. | : 6,511,192 B1 | Page 1 of 1 |
| APPLICATION NO. | : 09/482204 | |
| DATED | : January 28, 2003 | |
| INVENTOR(S) | : Paul R. Henion et al. | |

It is certified that error appears in the above-identified patent and that said Letters Patent is hereby corrected as shown below:

Title Page, (57) ABSTRACT, Line 10, "support" should be --supports--.

Column 1, Line 13, "reward" should be --rearward--.

Column 1, Line 39, delete "of", second occurrence.

Column 1, Line 40, delete "the"

Column 10, Line 63, "rearward" should be --rearwardly--.

Column 12, Line 19, Claim 6, "first" should be --second--.

Signed and Sealed this

Twenty-ninth Day of August, 2006

JON W. DUDAS
*Director of the United States Patent and Trademark Office*